May 2, 1950 B. A. ARVIDSON ET AL 2,506,262
GUMMED TAPE DISPENSER

Filed Aug. 8, 1946 7 Sheets-Sheet 1

Inventors: Bengt A. Arvidson
and William C. Ruth

May 2, 1950　　　B. A. ARVIDSON ET AL　　　2,506,262
GUMMED TAPE DISPENSER

Filed Aug. 8, 1946　　　7 Sheets-Sheet 3

Inventors: Bengt A. Arvidson
and William C. Ruth
by Flemming & Flemming
Attorneys

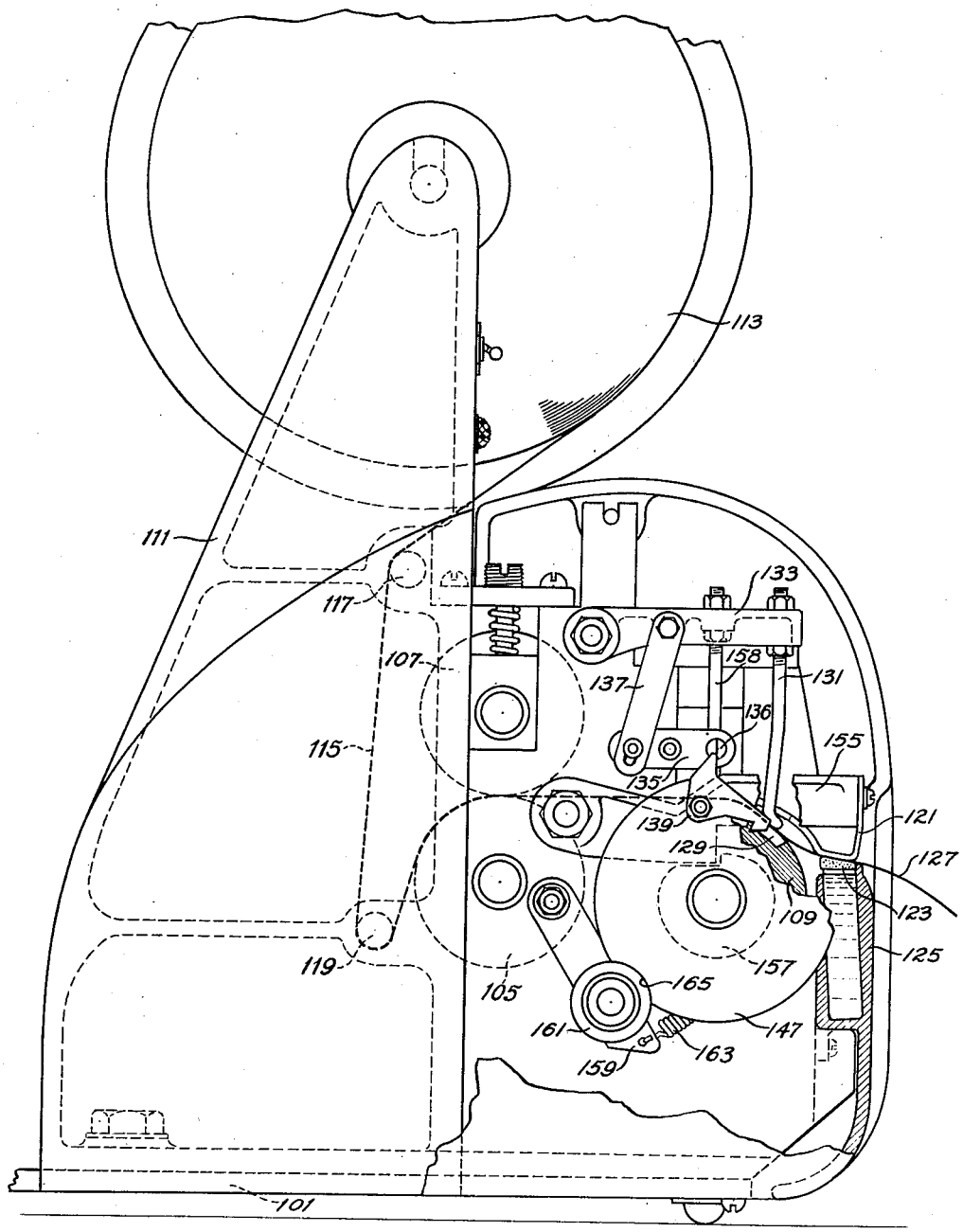

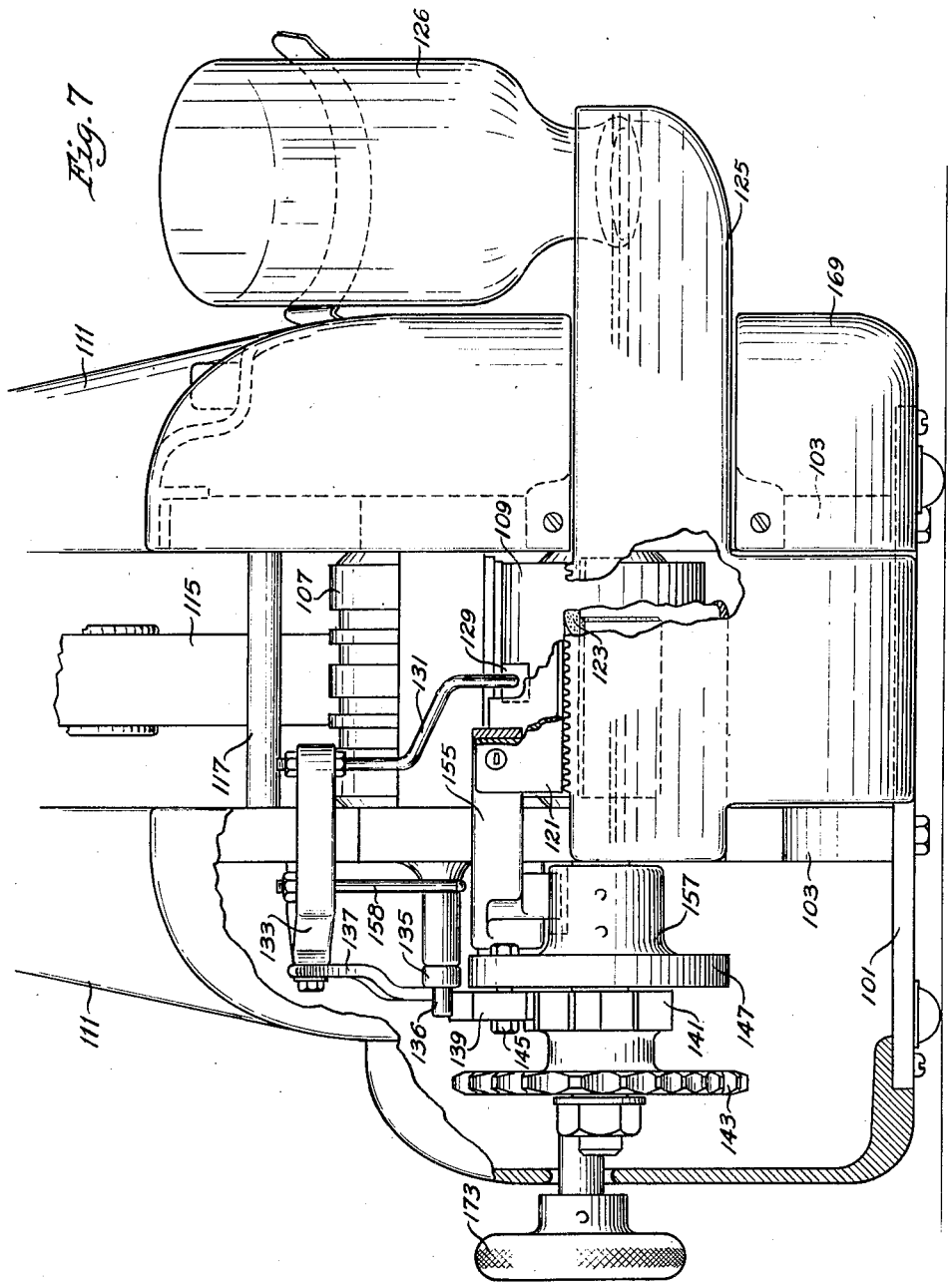

May 2, 1950   B. A. ARVIDSON ET AL   2,506,262
GUMMED TAPE DISPENSER
Filed Aug. 8, 1946   7 Sheets-Sheet 6
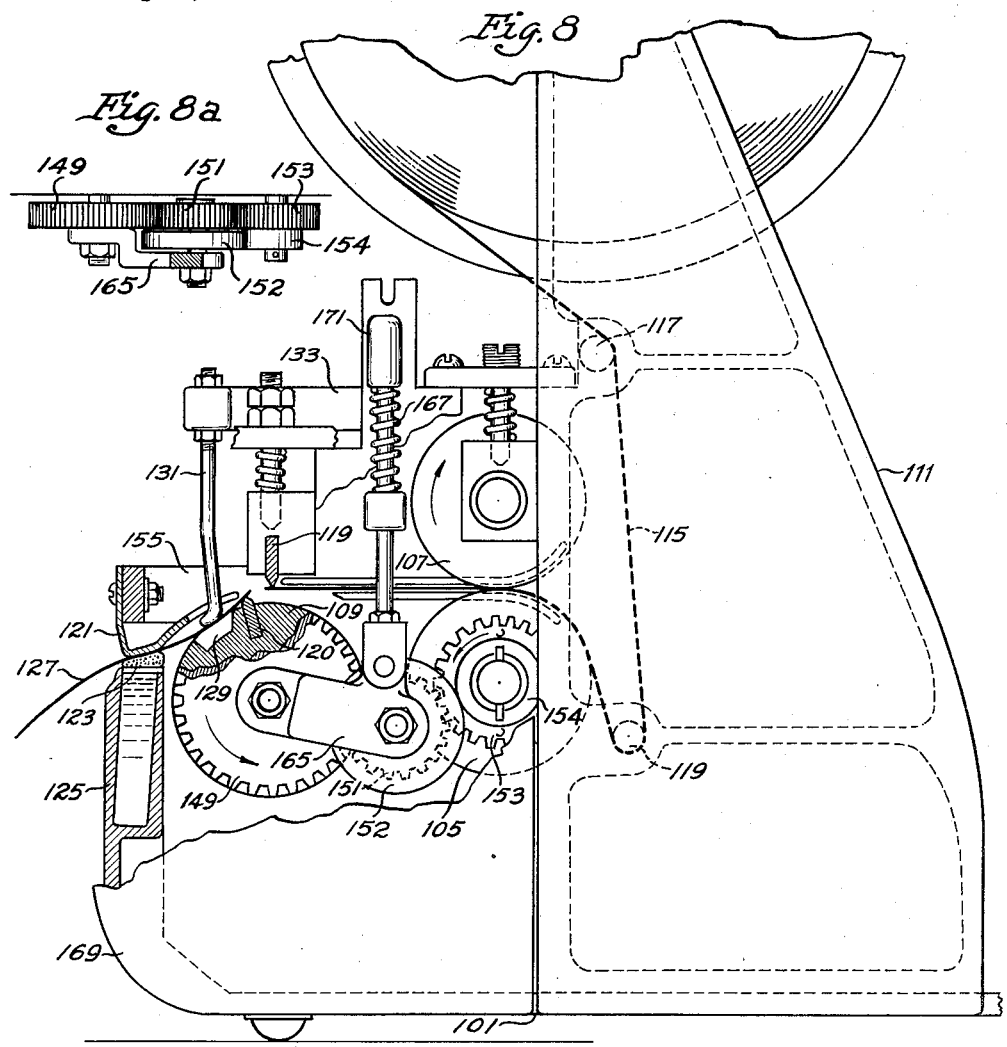
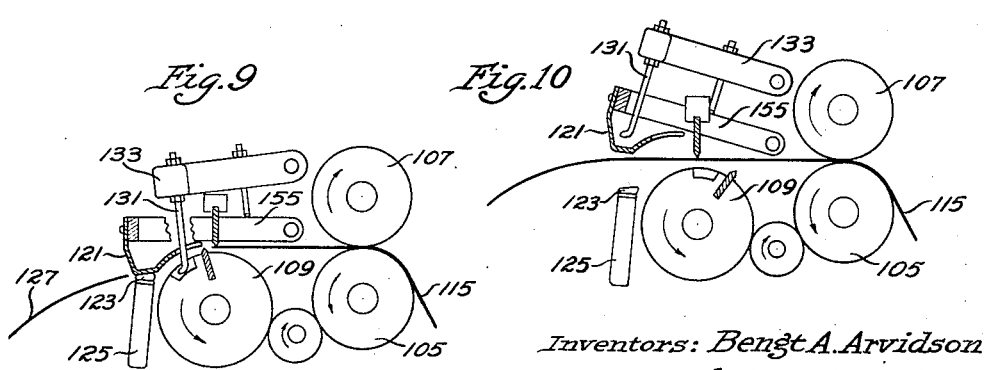
Inventors: Bengt A. Arvidson
and William C. Ruth
by Munning & Munning
Attorneys May 2, 1950  B. A. ARVIDSON ET AL  2,506,262
GUMMED TAPE DISPENSER Filed Aug. 8, 1946   7 Sheets-Sheet 7

Inventors:
Bengt A. Arvidson
and William C. Ruth
Attorneys

Patented May 2, 1950

2,506,262

UNITED STATES PATENT OFFICE 2,506,262

GUMMED TAPE DISPENSER

Bengt A. Arvidson, Villa Park, and William C. Ruth, Des Plaines, Ill., assignors to Miller Wrapping & Sealing Machine Co., Chicago, Ill., a corporation of Illinois Application August 8, 1946, Serial No. 689,250

13 Claims. (Cl. 91—14.5)

The machine of the present invention is an improved dispenser which is arranged to automatically deliver predetermined lengths of wetted gummed tape.

Whenever large quantities of packages are to be sealed or labeled with the aid of gummed tape, it is desirable that predetermined lengths of such tape be furnished to the wrapper. It is undesirable to employ pre-cut lengths of tape, due to the fact that several lengths tend to stick together causing delay to the operator in separating individual lengths of tape. A further disadvantage is that in handling the tape after it has been wetted, the wrapper's hands become coated with gum from the tape, making such handling difficult and awkward. In the past, gummed tape dispensers have been provided which issue predetermined lengths of gummed tape in response to the operation of a lever. Such dispensers require two operations on the part of the wrapper to obtain a length of tape; first, the lever must be depressed to issue the tape from the machine; and second, the tape must be seized and torn from the machine on a serrated knife usually provided thereon.

The machine of the present invention is designed to overcome the above difficulties through the provision of intermittently operable tape advancing and cutting means through which is extended a continuous length of tape to be dispensed, means for wetting and holding a severed portion of the tape extending through said first means in a position accessible for grasping, and means responsive to the drawing of the severed portion from the wetting and holding means for operating the tape advancing and cutting means to advance the continuous length of tape to the wetting and holding means and to sever such advanced portion of tape from the continuous length thereof.

One of the objects of the present invention is to provide an improved gummed tape dispenser which is operative to prepare a predetermined length of wetted gummed tape in response to the drawing of a previously prepared length from the dispenser.

Another object of the invention is to provide a gummed tape dispenser which is operative to sever a predetermined length of gummed tape from a roll thereof and wet the same in response to the drawing of a previously severed and wetted length from the dispenser.

A further object of the invention is to provide a dispenser, of the type described, which is operative to sever a predetermined length of gummed tape from a roll thereof and to wet a previously severed length in response to the drawing thereof from the dispenser.

Still another object of the invention is to provide a dispenser, in accordance with the preceding object, wherein wetting of the previously severed length of tape is confined to a selected portion of its length.

A still further object of the invention is to provide a gummed tape dispenser, in accordance with the preceding objects, which is arranged to permit ready adjustment of the length of tape dispensed therefrom.

These and other objects of the invention will be more fully set forth in the following specification taken in conjunction with the accompanying drawings, wherein:

Fig. 6 is a side elevational view of a second embodiment of the invention, with portions thereof omitted to reveal certain operating features of the machine;

Fig. 7 is a front elevational view of the second embodiment of the invention, with portions of the casing broken away to disclose the details of a clutch mechanism incorporated in the machine;

Fig. 8 is a side elevational view of the machine, as seen from the right of Fig. 7, with portions thereof broken away to reveal the method of adjusting the length of tape;

Fig. 8a is a detail view of a gear changing arrangement shown in Fig. 8, as seen from above;

Figs. 9 and 10 are schematic diagrams of the machine as seen in Fig. 8, illustrating the sequence of operations thereof;

Figure 1:
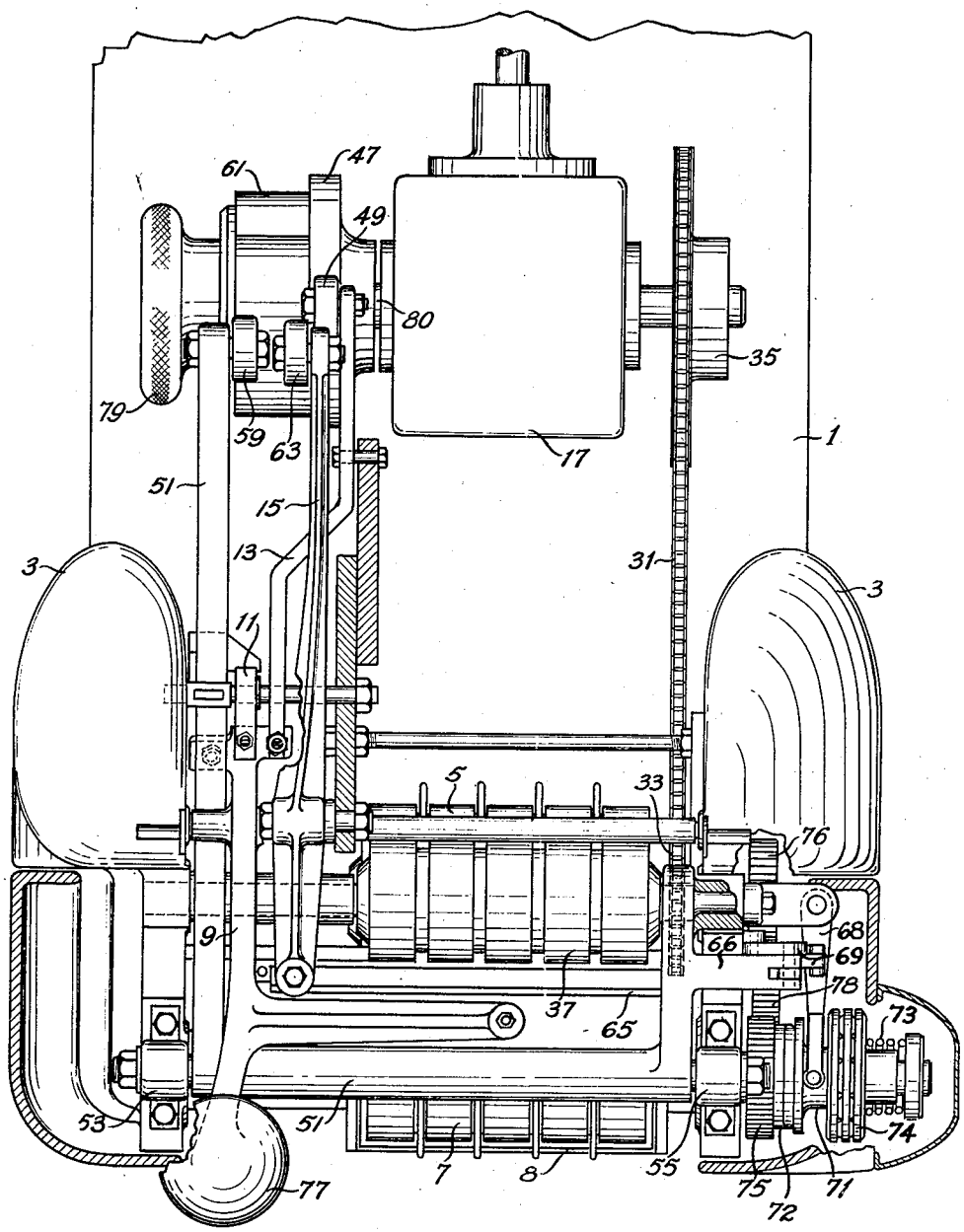
Fig. 1 is a top view of one embodiment of the invention with certain portions broken away and other portions shown in section to more clearly reveal the construction thereof.
Figure 2:
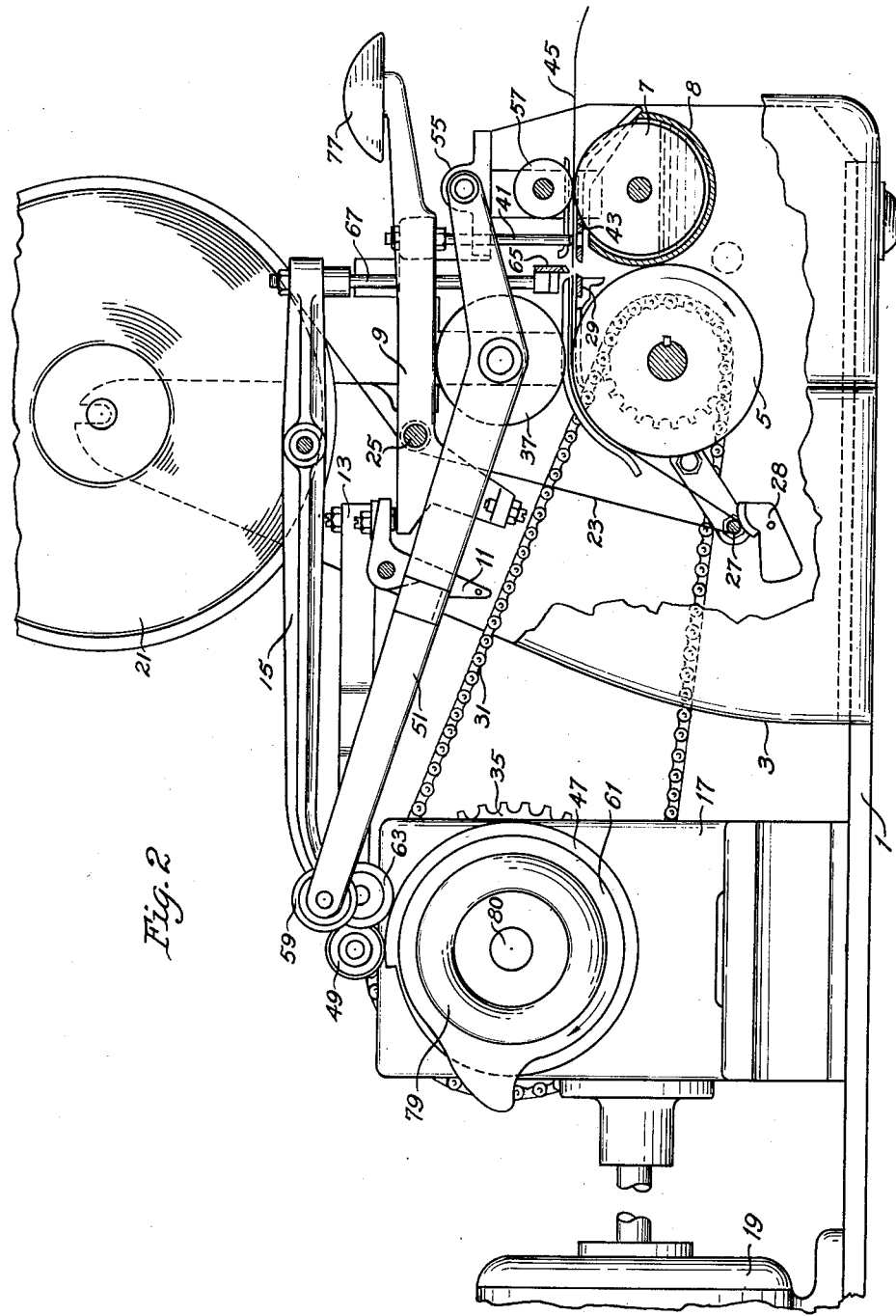
Fig. 2 is a side elevational view of the machine shown in Fig. 1, with portions thereof omitted to more clearly reveal the operating features.

Briefly described, the embodiment of the invention illustrated in Figs. 1 and 2 comprises normally separated drive and pressure rollers between which a gummed tape passes and thence extends between cutting knives and over a wetting roller. The portion of the tape extending beyond the cutting knives is normally severed, either wholly or partially, from the remainder of the tape. A trip finger is provided which is arranged to initiate the operation of a single cycle clutch mechanism in response to the drawing of the severed portion of tape from the machine. The single cycle clutch mechanism is arranged to bring the drive and pressure rollers together for a predetermined interval to advance a desired length of tape from a continuous roll thereof between the cutting knives and over the wetting roller. When the single cycle clutch mechanism is disengaged, the cutting knives are operated to sever the portion of tape extending therebeyond from the continuous length thereof.

Referring now more in detail to the drawings, in Figs. 1 and 2 there is shown a gummed tape dispenser including a base plate 1 and upstanding frame members 3 supporting a drive roller 5, a wetting roller 7, a trip lever 9, a catch 11, a locking lever 13, and a knife lever 15. The base plate 1 also supports a speed reducer 17 and a driving motor 19. A roll 21 of gummed tape is supported at the upper ends of the frame members 3. A web 23 extending from the roll 21 passes over guide rollers 25 and 27, thence over the drive roller 5, stationary knife 29, and over the wetting roller 7. The drive roller 5 is rotated constantly, during operation of the machine, by means of a sprocket chain 31 passing over sprocket wheels 33 and 35; but due to the fact that the pressure roller 37 associated with the drive roller 5 is normally spaced therefrom, the web 23 normally remains stationary. The web is prevented from sliding back by a pivotally mounted and weighted pressure pad 28 (Fig. 2).

Figure 3:
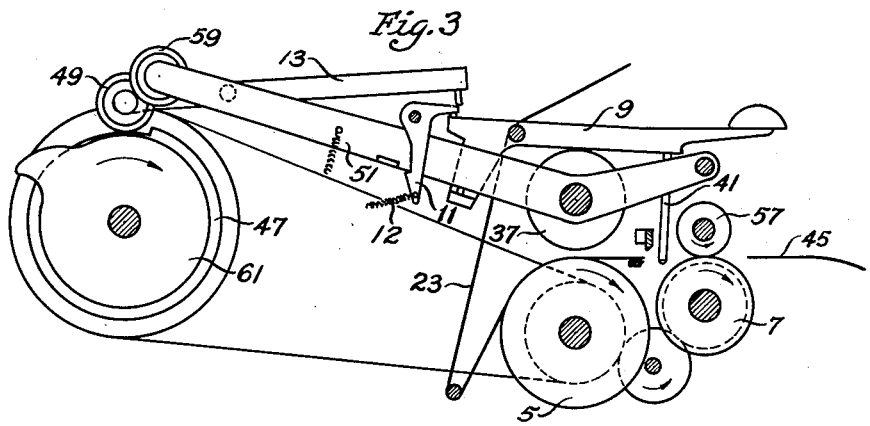
Figs. 3, 4 and 5 are views illustrating the sequence of operations of the dispenser shown in Figs. 1 and 2.
Figure 4:
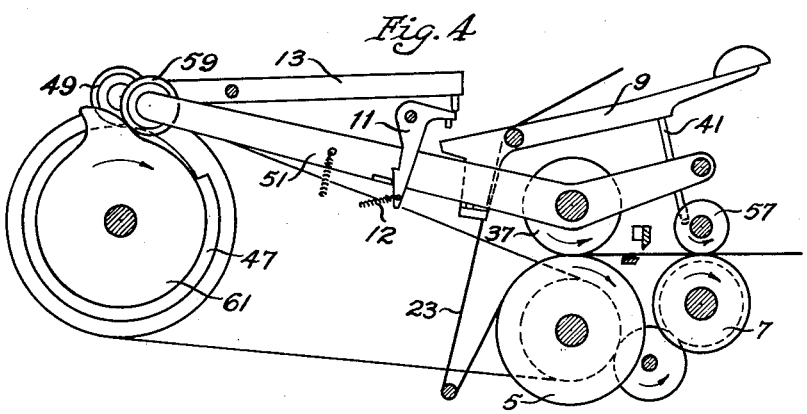

A trip finger 41 depending from the trip lever 9 is normally supported above an opening in a plate 43 but is prevented from entering the opening by a severed portion 45 of the web 23 covering such opening. When the severed portion 45 is drawn from the machine, the trip finger 41 is free to pass through the opening in the plate 43, but is prevented from doing so by the locking lever 13 engaging one end of the trip lever 9 and preventing clockwise rotation thereof until a cam 47 rotates to a tripping position where the cam follower 49, which is rotatably secured to one end of the locking lever 13, is permitted to descend. When the cam 47 reaches the tripping position, the locking lever 13 rotates counter-clockwise permitting the trip lever 9 to rotate in a clockwise direction and thereby produce a counter-clockwise rotation of the catch 11 to effect release of a pressure roller lever 51 normally supported by the catch 11, as illustrated in Fig. 3. The lever 51 is journaled in bearings 53 and 55 and the pressure roller 37 is journaled in arms extending from the portion of lever 51 which extends between the bearings 53 and 55. When the lever 51 is released by the catch 11 it rotates in a counter-clockwise direction to lower the pressure roller 37 and thereby firmly press the web 23 into engagement with the drive roller 5, causing the web 23 to be advanced over the lower knife 29 and between wetting roller 7 and a pressure roller 57 associated therewith, as illustrated in Fig. 4. The trip finger 41 is raised out of the path of the web 23 by the lever 51. As the web 23 passes over the wetting roller 7 the underside of the web is wetted, or moistened, by a thin film of water which adheres to the roller 7 as it revolves in a body of water contained in a well 8.

At the time that lever 51 is released by catch 11, an arm 66 extending from the right side of the lever (Fig. 1) causes a forked arm 68 to be shifted towards the left through a toggle linkage 69. A clutch disc 71, having a groove in which the forked end of arm 68 is engaged, is then pressed into engagement with a second clutch disc 72 by a compression spring 73 acting through a thrust bearing 74. The clutch disc 72 rotates freely on the shaft of wetting roller 7 together with a spur gear 75, which is constantly driven from the shaft of the driving roller 5 through a spur gear 76 secured thereto and an idler gear 78. The clutch disc 71 is keyed to the shaft of the wetting roller whereby this roller is power driven during the advancement of the tape. The surface speed of the wetting roller 7 is preferably made slightly greater than that of the driving roller 5 so as to maintain taut the portion of the web which extends therebetween. Rollers 37 and 57 are rotated solely through contact with the web.

The advancement of the web continues until a cam roller 59, which is journaled at the end of the pressure roller lever 51, is engaged by a cam 61, which causes the lever 51 to be rotated in a clockwise direction until it is engaged by the clutch 11, thereby separating the pressure roller 37 and drive roller 5 to prevent further advancement of the web 23. When the lever 51 is raised by cam 61, the toggle linkage 69 connected to arm 66 operates the clutch throughout arm 68 towards the right to disengage the wetting roller 7 from the driving roller 5. The wetting roller is thus enabled to rotate freely when the extended portion of the gummed tape is subsequently drawn from the machine.

Figure 5:
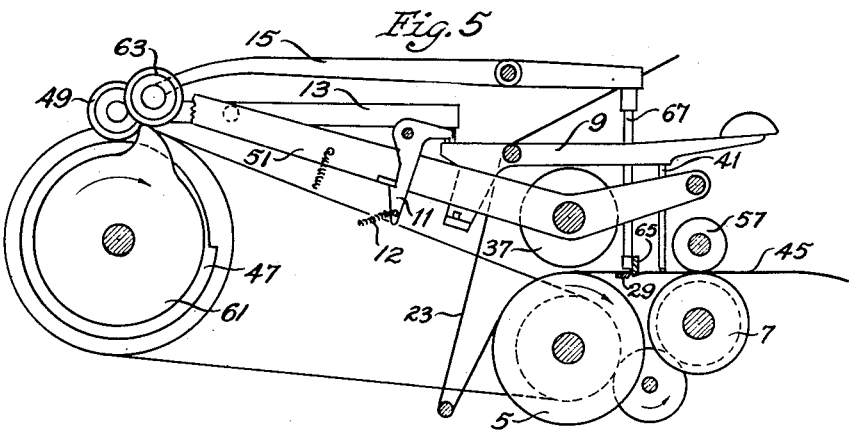

At substantially the same time that the cam roller 59 is engaged by the cam 61, the cam roller 63 is engaged by this cam thereby causing the knife lever 15 to rotate in a clockwise direction; this lowers a stationary knife 65, which is secured to a knife arm 67 depending from one end of the knife lever 15, to sever the portion of the web 23 extending beyond the knives 29 and 65, as illustrated in Fig. 5. In certain instances it may be preferred to arrange knife 29 so that the web 23 is cut only part way across its width, or is otherwise weakened as by notching or perforating, leaving the portion of tape extending from the machine attached to the continuous length of tape but partially severed therefrom. The extending, or severed, portion of the tape is then separated from the continuous length thereof as such portion is drawn from the dispenser. Therefore, in the appended claims, the term "sever" is intended to apply to any weakening of the web which enables separation of the extending portion of the tape from the continuous length thereof as such portion is drawn from the machine.

It may at times be desirable to operate the mechanism manually rather than automatically, particularly when considerable intervals of time elapse between drawing of successive lengths of tape from the machine, to avoid drying of the wetted portion of the severed length of the tape 45. For manual operation the tension of the coil spring 12 (Fig. 3) is increased to the point where the weight of the trip lever 9 is insufficient to rotate the catch 11. The machine is then tripped by depressing a bell-shaped member 77, secured to one end of the trip lever 9, which causes the machine to go through a cycle of operations as previously described. The cut and wetted portion of the gummed tape is drawn from the machine immediately and used; but, due to the increased tension of the coil spring 12, the machine remains idle until the bell-shaped member 77 is again depressed.

The length of tape which is dispensed by the machine is governed by the relative settings of the cams 47 and 61. Cam 47 is keyed to shaft 80 and cam 61 is clamped to cam 47 by means of a hand wheel 79 which is threaded on shaft 80. In order to adjust the length of the tape severed from the continuous length thereof, the hand wheel 79 is loosened and the cam 61 is rotated relative to the cam 47. The hand wheel 79 is then retightened to firmly secure cam 61 in the desired position relative to cam 47.

There are numerous applications where it is desirable to provide lengths of gummed tape which are wetted over only a selected portion at one end thereof, such, for example, as the application of labels to packages where the labels surround the package in the form of a band which is slidable relative to the package. By using a gummed label which is wetted over only a selected portion of its length, handling of the labels is facilitated since the wrapper need not touch the wetted portion of the label. In such cases the wetting may be confined to one end portion of the tape which is then lapped over the opposite end portion for adherence thereto.

The embodiment of the invention disclosed in Figs. 6 to 8 is particularly designed to issue predetermined lengths of tape from a continuous roll thereof and to wet such lengths over a selected portion at one end thereof.

Described briefly, this embodiment of the invention comprises drive and pressure rollers between which a web of gummed tape passes to extend beneath a stationary knife, over the movable knife of a rotary cutter, and thence over a wick against which the tape is pressed by a movable pressure shoe. The web is normally severed at a point between the wick and the stationary knife and the severed portion normally prevents a trip finger from falling into an opening in the shaft of the rotary knife. Upon the drawing of the severed length of tape from the machine, the portion between the wick and the stationary knife is wetted and the trip finger is allowed to enter the opening in the rotary knife shaft, thereby initiating the operation of a single cycle clutch which causes the drive roller and rotary knife to be operated for a predetermined interval during which a new length of tape is advanced into the position occupied by the length drawn from the machine and is severed from the remainder of the continuous length of tape by the rotary knife. During the advancement of a new length of tape, the pressure shoe is raised from the wick, whereby the tape is allowed to pass clear of the wick to prevent wetting of the forward end thereof.

Referring now more in particular to Figs. 6, 7 and 8, there is shown a gummed tape dispenser comprising a base plate 101 having a pair of upstanding frame members 103 secured thereto which support a drive roller 105, a pressure roller 107, and a rotary knife shaft 109. The mechanism is enclosed by a casing including a portion 111 adapted to support a roll 113 of gummed tape at the upper end of the casing. A web 115 extending from a roll 113 passes over guide rollers 117 and 119, over the drive roller 105 and beneath the pressure roller 107, beneath a resiliently supported stationary knife 119, over the rotary knife shaft 109, and thence between a pressure shoe 121 and a wick 123 extending from a removable well 125. Water is supplied to the well 125 from a water tank 126. The extending portion 127 of the tape which is severed from the web 115 covers an opening 129 in the rotary knife shaft 109 to support a trip finger 131 which is disposed above such opening.

Figure 11:
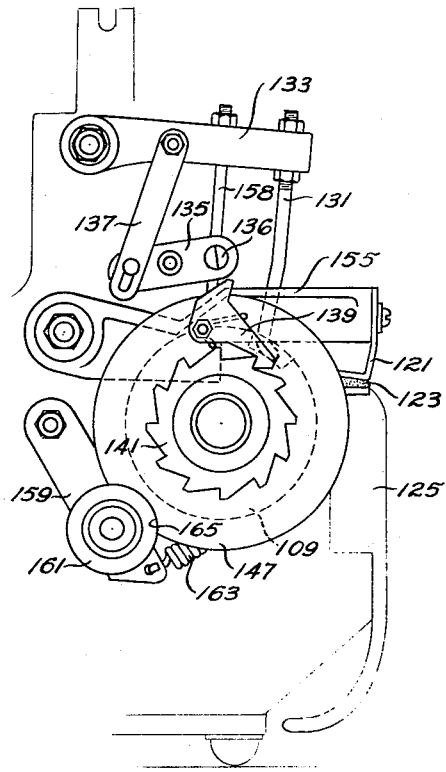
Figs. 11 and 12 are views illustrating the sequence of operations of certain portions of the machine elsewhere shown in Fig. 6.

When the severed tape length 127 is drawn from the machine, as illustrated in Fig. 9, the end of the severed length is wetted by the wick 123, and the opening 129 is then uncovered to permit the trip lever 131 to descend, thereby causing a trip lever 133 to rotate in a clockwise direction, which effects counter-clockwise rotation of a lever 135 through movement of a connecting link 137. When a stud 136 is a raised by movement of the lever 135, a catch 139 is released to engage a tooth of a ratchet wheel 141, which rotates with a sprocket wheel 143 journaled on an extending portion of the rotary knife shaft 109, as illustrated in Fig. 11. The sprocket wheel 143 is continuously driven by means of a driving motor and speed reducer (not shown). When the catch or pawl 139 engages the ratchet wheel 141, the rotary knife shaft 109 is driven with the ratchet wheel 141 through the catch 139, which is pivoted on a shoulder screw 145 extending from a flange 147 secured to the extending portion of the rotary knife shaft 109. The motion of the rotary knife shaft 109 is transmitted to the drive roller 105 through the medium of a spur gear 149, idler gear 151, and a second spur gear 153.

Figure 12:
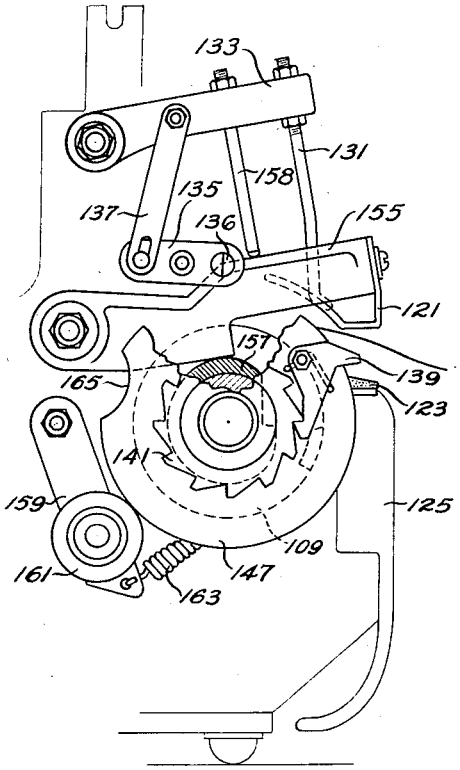

During the rotation of the rotary knife shaft 109, a pressure shoe lever 155 is raised by a cam 157 and the trip lever 133 is in turn raised by an arm 158 depending therefrom which is engaged by the pressure shoe lever 155, as illustrated in Figs. 10 and 12. Just before the rotary knife shaft 109 has completed one revolution, the lever 155 is released, which permits trip lever 133 to return to its normal position. At this time the stud 136 extending from the lever 135 lies in the path of the catch 139. Engagement of the catch 139 and stud 136 causes the catch to be disengaged from the ratchet wheel 141, as shown in Fig. 6, and thereby stops further rotation of the rotary knife shaft 109. The rotary knife 120 passes the stationary knife 119 just prior to the time that the rotary knife shaft 109 is stopped, and thereby severs the extending portion 127 of the web from the continuous length 115 thereof. As previously noted, in certain instances it may be preferred to only partially sever the extending portion of the web from the continuous length thereof. A lever 159 which is pivoted at one end to one of the frame members 103 has a roller 161 rotatably secured thereto at its other end, and is biased into engagement with the flange 147 by a coiled spring 163. The roller 161 engages a detent 165 in the flange 147, when the rotary knife shaft 109 is in its normal position, to provide positive stopping of such shaft.

To enable variation of the length of tape cut from the roll thereof, the spur gear 153 is removably secured to the drive roller 105 and the idler 151 is rotatably secured to a link 165 which is rotatable about the axis of the rotary knife shaft 109 and is biased by a coil spring 167 to rotate in a counter-clockwise direction. To change gears, it is simply necessary to remove a snap-on portion 169 of the casing of the machine, to depress a plunger 171 to effect clockwise rotation of the link 165 and thereby disengage the idler 151 and spur gear 153, and then to slide the spur gear 153 from the shaft of the drive roller 105 and substitute a spur gear having a different number of teeth. A ball bearing roller 152 is mounted between the idler gear 151 and the link 165 on a stud supporting the idler gear. The periphery of the roller 152 bears against a collar 154, which extends from the spur gear 153, to locate the axes of the idler gear 151 and the spur gear 153 at the required spacing for proper meshing of the gear teeth. The roller 152 also prevents undesired axial movement of the spur gear 153.

When the gummed tape is imprinted with recurrently appearing labels or other markings, it is necessary to adjust the position of the rotary knife relative to the tape. This is accomplished by depressing the plunger 171 to disassociate the rotary knife shaft 109 and the drive roller 105, whereby the tape may be advanced or retarded by means of a hand wheel 173, which is secured to an extending portion of the drive roller shaft 105, without moving the rotary knife shaft 109.

Figure 13:
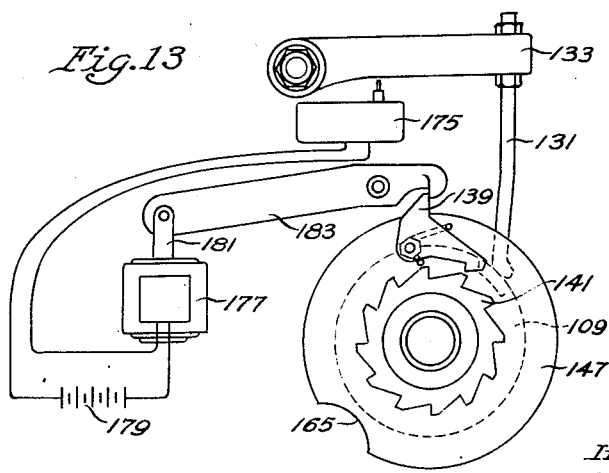
Fig. 13 discloses a modification of the second embodiment of the invention incorporating an electrical trip mechanism for initiating a sequence of operations thereof in response to the drawing of a severed portion of tape from the machine.

When a very thin tape is being used, it may be desirable to employ a trip mechanism which exerts only a very light pressure on the tape. In such cases, the modification illustrated in Fig. 13 may be employed to advantage. In this modification, the trip lever 133 is arranged to actuate a snap action type contact 175 to energize a solenoid 177 in series with a source of current 179 when the trip finger 131 is allowed to descend. A plunger 181 associated with the solenoid 177 rotates a lever 183 in a counter-clockwise direction in response to clockwise rotation of the trip lever 133 to release the catch 139 and thereby initiate a cycle of operations of the machine in a manner similar to that accomplished through the movement of the connecting link 137 in the embodiment illustrated in Figs. 6 to 8.

It should now be apparent that by reason of the novel construction and operating features of a machine incorporating the principles of the present invention, a gummed tape dispenser has been provided which greatly facilitates the wrapping or labeling of packages with the aid of gummed tape by minimizing the number of operations required of the wrapper and through the elimination of all unnecessary handling of cut lengths of gummed tape and, in particular, the handling of wetted portions thereof.

While the dispenser has been particularly designed for use with tape having a coating of adhesive thereon which is rendered tacky upon wetting with water during the passage of the tape through the machine, it should be apparent that unprepared tape may be employed if desired. When unprepared tape is used, the reservoir or well of the machine is filled with a thin solution of a suitable adhesive in place of water. The wetting means then serves to apply a coating of adhesive to the tape during its passage through the machine. Therefore, in the appended claims, the term "wetting" is intended to apply to either method of forming a tacky adhesive coating on the tape.

While the invention has been illustrated by the disclosure of particular embodiments thereof, it is obvious that numerous other embodiments employing the principles of the invention are possible, and therefore the aim of the appended claims is to cover all such modifications as fall within the true spirit and scope of the invention.

What is claimed is:

1. In a tape dispenser, intermittently operable tape advancing means for feeding a continuous length of tape from a roll, cutting means operatively connected with the advancing means for cutting a predetermined length of tape to be dispensed, wetting means spaced from the path of movement of the tape, a pressing member movable toward and from the wetting means and initially spaced from the wetting means to provide a passage for the severed portion of the tape, means controlled by the cutting means for effecting movement of the pressing member toward the wetting means for holding the severed portion of the tape in contact with the wetting means for wetting a selected portion of the tape and for holding the severed portion in a position accessible for grasping, means responsive to the drawing of the severed portion of the tape from between the pressing member and the wetting means for operating said first means to advance the continuous length of tape and to operate the cutting means for severing such advanced portion of the tape from the continuous length thereof, and means for moving the pressing member away from the wetting means during operation of said first means to prevent wetting of the tape during the advancement thereof.

2. In a tape dispenser, intermittently operable tape advancing means for feeding tape from a roll, cutting means operatively connected with the tape advancing means and operating to sever a predetermined length of the tape, wetting means spaced from the path of movement of said predetermined length of tape to permit portions of the tape to be advanced past the wetting means in a dry condition, and means controlled and operated by the cutting means for moving the tape into contact with the wetting means for wetting another portion of said length of tape.

3. In a tape dispenser, intermittently operable tape advancing means for feeding tape from a roll, cutting means operatively connected with the tape advancing means and operating to sever a predetermined length of the tape, wetting means spaced from the path of movement of said predetermined length of tape to permit portions of the tape to be advanced past the wetting means in a dry condition, a pressing member spaced from the wetting means to provide a passage for said length of tape therebetween, and means controlled and operated by the cutting means for effecting movement of the pressing member for clamping the length of tape between it and the wetting means to wet only a portion of the length of tape and maintain the same in position for manual removal from the dispenser.

4. In a tape dispenser, intermittently operable tape advancing means for feeding tape from a roll, cutting means operatively connected with the tape advancing means and operating to sever a predetermined length of the tape, wetting means spaced from the path of movement of said predetermined length of tape to permit portions of the tape to be advanced past the wetting means in a dry condition, a pressing member spaced from the wetting means to provide a passage for said length of tape therebetween, and means including a lever and cam controlled and actuated by the cutting mechanism for actuating the pressing member for clamping the length of tape between it and the wetting means to wet only a portion of the length of tape and maintain the same in position for manual removal from the dispenser.

5. In a tape dispenser, intermittently operable tape advancing means for feeding tape from a roll, cutting means operatively connected with the tape advancing means and operating to sever a predetermined length of the tape, wetting means spaced from the path of movement of said predetermined length of tape to permit portions of the tape to be advanced past the wetting means in a dry condition, a pressing member spaced from the wetting means to provide a passage for said length of tape therebetween, means controlled and operated by the cutting means for effecting movement of the pressing member for clamping the length of tape between it and the wetting means to wet only a portion of the length of tape and maintain the same in position for manual removal from the dispenser, and means responsive to the drawing of the severed portion of the tape from between the pressing member and the wetting means for operating the tape advancing means and the cutting means.

6. In a tape dispenser, intermittently operable tape advancing means for feeding tape from a roll, cutting means operatively connected with the tape advancing means and operating to sever a predetermined length of the tape, wetting means spaced from the path of movement of said predetermined length of tape to permit portions of the tape to be advanced past the wetting means in a dry condition, a pressing member spaced from the wetting means to provide a passage for said length of tape therebetween, means including a lever and cam controlled and actuated by the cutting mechanism for actuating the pressing member for clamping the length of tape between it and the wetting means to wet only a portion of the length of tape and maintain the same in position for manual removal from the dispenser, and means responsive to the drawing of the severed portion of the tape from between the pressing member and the wetting means for operating the tape advancing means and the cutting means.

7. In a tape dispenser, intermittently operable tape advancing means for feeding tape from a roll, cutting means operatively connected with the tape advancing means and operating to sever a predetermined length of the tape, wetting means spaced from the path of movement of said predetermined length of tape to permit portions of the tape to be advanced past the wetting means in a dry condition, a pressing member spaced from the wetting means to provide a passage for said length of tape therebetween, means controlled and operated by the cutting means for effecting movement of the pressing member for clamping the length of tape between it and the wetting means to wet only a portion of the length of tape and maintain the same in position for manual removal from the dispenser, and means for moving the pressing member away from the wetting means to provide a space for the passage of portions of the tape in a dry condition.

8. In a tape dispenser, normally idle tape advancing means for feeding tape from a roll, cutting means operatively connected with the tape advancing means for severing a predetermined length of the tape, wetting means spaced from the path of movement of the said predetermined length of tape, means controlled and operated by the cutting means for moving said predetermined length of tape into contact with the wetting means and for holding said length of tape in a position accessible for grasping at the completion of the operation of said first means, a continuously operated driving motor, a single cycle clutch for associating said driving motor with the first means to operate the latter through a cycle of operations, means responsive to the drawing of the severed portion of the tape from the wetting means and holding means for initiating the operation of said clutch to cause said first means to advance a continuous length of tape to said second means and to sever such advanced portion of the tape from the continuous length thereof, and means for moving said tape holding means away from the wetting means to provide a space for the passage of portions of the tape in a dry condition.

9. In a tape dispenser, normally idle tape advancing means for feeding a continuous length of tape from a roll, cutting means operatively connected with the tape advancing means for cutting a predetermined length of the tape, wetting means spaced from the path of movement of the tape, means controlled and operated by the cutting means for moving said length of tape into contact with the wetting means and for holding the tape in a position accessible for grasping, a continuously operated driving motor, a single cycle clutch for associating the driving motor with said first means to operate the latter through a cycle of operations, means for moving the tape holding means away from the wetting means to provide a space for the passage of portions of the tape in a dry condition, and manually operable means for initiating the operation of said clutch to cause said first means to advance a continuous length of tape to said second means and to sever said advanced portion from the continuous length of tape.

10. In a gummed tape dispenser, a constantly operated driving roller, a pressure roller adapted to cooperate with the driving roller for feeding a web of tape from a roll, a catch normally supporting the pressure roller separated from the driving roller, wetting means arranged to receive the gummed tape fed from said roll, cutting means located between the wetting means and the pressure roller for cutting a predetermined length of the web, a trip lever responsive to the drawing of the severed portion of the web from the dispenser for releasing the pressure roller for causing the driving roller and the pressure roller to become engaged and thereby advance the web, cam means for disengaging the pressure roller and the driving roller when the web has been advanced a predetermined distance, and cam means for operating the cutting means to sever the portion of the web advanced beyond the cutting means.

11. In a gummed tape dispenser, a constantly operated driving roller, a pressure roller adapted to cooperate with the driving roller for feeding a web of tape from a roll, a catch normally supporting the pressure roller separated from the driving roller, wetting means arranged to receive the gummed tape fed from said roll, cutting means located between the wetting means and the pressure roller for cutting a predetermined length of the web, a trip lever responsive to the drawing of the severed portion of the web from the dispenser for releasing the pressure roller for causing the driving roller and the pressure roller to become engaged and thereby advance the web, cam means for disengaging the pressure roller and the driving roller when the web has been advanced a predetermined distance, cam means for operating the cutting means to sever the portion of the web advanced beyond the cutting means, said first cam means being adjustable for varying the length of the severed portion of the web.

12. In a tape dispenser, a constantly operated driving roller, a pressure roller associated therewith and biased toward the driving roller, a catch normally supporting the pressure roller separated from the driving roller, cutting means arranged to sever a predetermined length of a web of gummed tape fed by the driving and pressure rollers from a roll of said tape, a trip lever for releasing the pressure roller for causing the driving roller and pressure roller to become engaged and thereby advance the web, said trip lever being provided with a trip finger intersecting the path of movement of the web and normally blocked by the severed portion of the web and being operative to release the pressure roller when the path of the trip finger is unblocked by drawing the severed portion of the web from the dispenser, and cam means for disengaging the driving roller and pressure roller when the web has been advanced a predetermined distance and for operating the cutting means to sever said predetermined length of the web advanced beyond the cutting means.

13. In a tape dispenser, a constantly operated driving roller, a pressure roller associated therewith and biased toward the driving roller, a catch normally supporting the pressure roller separated from the driving roller, cutting means arranged to sever a predetermined length of a web of gummed tape fed by the driving and pressure rollers from a roll of said tape, a trip lever for releasing the pressure roller for causing the driving roller and pressure roller to become engaged and thereby advance the web, said trip lever being provided with a trip finger intersecting the path of movement of the web and normally blocked by the severed portion of the web and being operative to release the pressure roller when the path of the trip finger is unblocked by drawing the severed portion of the web from the dispenser, a locking lever for holding the trip lever against movement, cam means for operating the locking lever to release the trip lever, and cam means for disengaging the driving roller and the pressure roller when the web has been advanced a predetermined distance and for operating the cutting means to sever the portion of the web advanced beyond said cutting means.

BENGT A. ARVIDSON.
WILLIAM C. RUTH.

REFERENCES CITED

The following references are of record in the file of this patent:

UNITED STATES PATENTS

| Number | Name | Date |
|---|---|---|
| 2,396,417 | Gerlach | Mar. 12, 1946 |
| 2,405,790 | Krueger | Aug. 13, 1946 |